March 29, 1955  F. K. H. NALLINGER  2,705,139

SPRING-ADJUSTING MEANS FOR VEHICLES

Filed April 16, 1952

INVENTOR.
FRIEDRICH K. H. NALLINGER.

BY *Dicke and Padlon*

ATTORNEYS.

United States Patent Office 2,705,139
Patented Mar. 29, 1955

2,705,139

SPRING-ADJUSTING MEANS FOR VEHICLES

Friedrich K. H. Nallinger, Stuttgart, Germany, assignor to Daimler-Benz Aktiengesellschaft, Stuttgart-Unterturkheim, Germany Application April 16, 1952, Serial No. 282,589

Claims priority, application Germany April 21, 1951

4 Claims. (Cl. 267—15)

My invention relates to spring-adjusting means for vehicles and, more particularly, to a device for altering the load imposed on the main springs of road vehicles by adjustment of additional auxiliary springs.

It is the object of my invention to provide a device of the type indicated which permits to so compensate considerable variations of the load of the vehicle as to maintain the road clearance thereof substantially unaffected by such variations so that the road clearance may be adjusted to a standard amount irrespective of the load.

It is another object of the present invention to afford a device capable of adjusting auxiliary springs in a simple and reliable manner to thereby relieve the main springs of the vehicle to a greater or lesser extent depending on the load. Further objects are to provide auxiliary springs which will not become effective unless the main springs are flexed beyond certain limits which may be manually adjusted in a simple manner; to provide a motor-driven spring-adjusting device that may be easily set in motion by the driver and will be automatically turned off when it attains one or the other of its end positions; to provide an improved spring system for road vehicles including helical springs and auxiliary torsional springs which are ineffective unless said helical springs are compressed beyond certain limits which may be readily adjusted by the driver so as to meet the requirements depending upon the load of the vehicle; and to provide a motor-driven adjusting unit for said auxiliary torsional springs of a compact and rugged structure mounted on the chassis of the vehicle. Further objects of my invention will appear from the description of a preferred embodiment thereof following hereinafter, and the features of novelty are pointed out in the claims.

Figure 1:
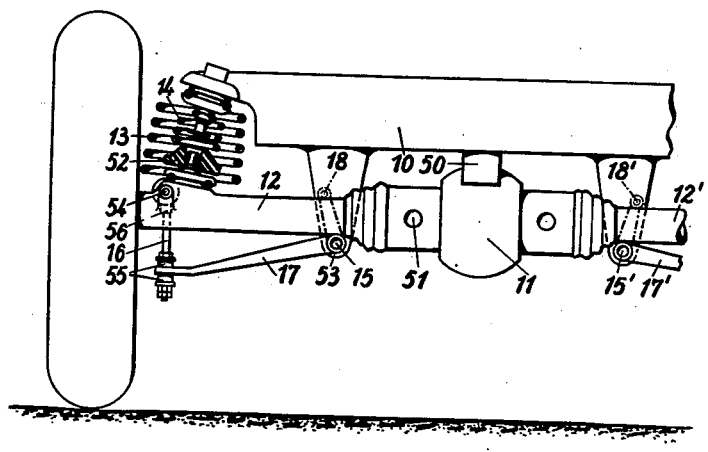
Figure 2:
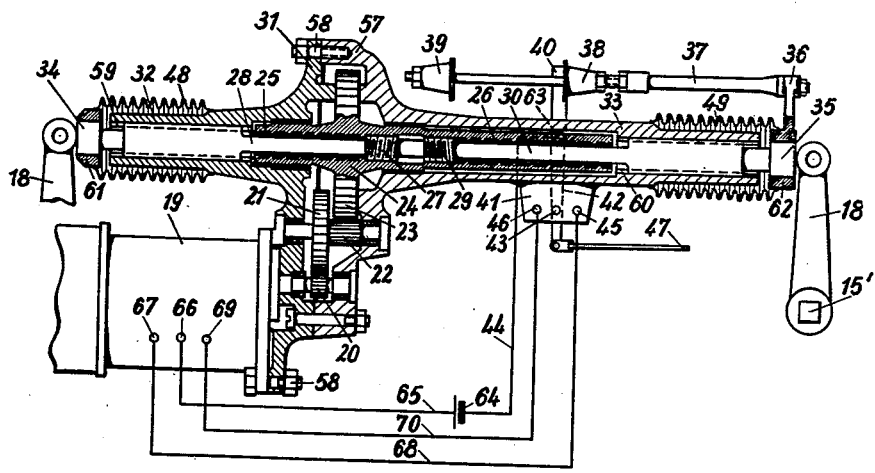

In the accompanying drawings in which one form of my invention is represented for the purpose of illustration rather than limitation of the invention, Fig. 1 shows a partial rear view of a motor vehicle equipped with the novel spring-adjusting device, and Fig. 2 is a sectional view of the spring-adjusting unit, the section being taken along a vertical transverse plane of the chassis.

In Fig. 1 the chassis of a motor vehicle is diagrammatically indicated at 10. A rear wheel is carried by a wheel-suspending member formed in the present embodiment by a half axle 12 linked to the casing 11 of a rear axle transmission attached to the chassis 10 preferably by resilient means 50, said half axle being pivotal to swing about a horizontal axis 51 extending lengthwise of the chassis 10 in a manner well known in the art.

The opposite rear wheel not shown is carried by a similar wheel-suspending member 12′ hinged to the casing 11 at the opposite side thereof. Since the wheel-suspending and springing means are symmetrically arranged on either side of the vehicle, it will be sufficient hereinafter to describe the means provided on one side of the vehicle only, it being understood that the means provided on the opposite side are similar and symmetrical.

The main spring associated with the wheel-suspending member 12 comprises a helical spring 13 having its upper end connected with the chassis 10 and its lower end with the wheel-suspending member 12. If desired, an additional helical spring 14 may be disposed inside of the spring 13, the upper end of the additional spring 14 being fixed to the chassis 10 by suitable means, whereas its lower end may abut against a rubber cushion 52 fixed to the member 12, the rubber cushion being normally spaced from the additional spring 14 engaging the same after the spring 13 has been compressed to a certain extent.

For the purpose of the present invention I have provided an auxiliary spring formed by a horizontal torsional rod 15 which is rotatably mounted in a bracket 53 depending from and attached to the chassis, said rod 15 having one arm at either end thereof, the arm 17 attached to its rear end extending outwardly, while the arm 18 attached to its front end extends upwardly as shown. The end of arm 17 is connected by a link 16 to a stud 54 fixed to the wheel-suspending member 12. The connection of link 16 with the arm 17 and with the stud 54 includes suitable rubber cushions 55 and 56 so as to provide a resilient connection between the arm 17 and the member 12.

The upwardly extending arms 18 and 18′ positioned on either side of the vertical central plane of the vehicle are located in a common vertical transverse plane extending in front of the brackets 53 and the casing 11, such plane being the plane of the section shown in Fig. 2. Between the arms 18 and 18′ a spring-adjusting unit is mounted on the chassis which has been omitted in Fig. 1 to simplify the illustration of the parts shown therein. Such unit comprises two substantially tubular casing sections 32 and 33 which have enlarged flanged adjoining portions 31 and 57 connected with one another by bolts and nuts 58 and enclosing between them a gearing to be described hereinafter. Each of the tubular casing sections 32 and 33 has internal splines 59 and 60 engaging splined sections of spindles 28 and 30 which are slidingly, but non-rotatably guided in the casing sections 31 and 57 and on their ends projecting therefrom carry heads 34 and 35 respectively. These heads 34 and 35 constitute adjustable stops which are normally spaced from and are, therefore, out of co-operative connection with the arms 18 and 18′ of the auxiliary springs, but are adapted, when the auxiliary springs upon flexion of the main springs 13 have been moved through a certain lost motion, to engage the arms 18 and 18′ and to thereby brace the auxiliary springs with respect to the chassis, it being understood that the casing 31 and 57 is rigidly mounted on the chassis.

The means for adjusting the stops 34 and 35 towards and away from one another comprise a threaded sleeve 24, a gearing, and a reversible electric motor 19. The inner ends of the spindles 28 and 30 have external threads 27 and 29 of opposite hand. The sleeve 24 is mounted in co-axial relationship with the spindles 28 and 30 and is journalled within the casing sections 31 and 57 and held against axial displacement relative thereto by engagement of the casing sections with a gear 23 integral with the sleeve 24. The sleeve has internal threads of opposite hand engaging the threads 27 and 29 of the spindles. Therefore, a rotation of the gear 23 in one direction or the other will displace the spindles and the stops 34 and 35 integral therewith outwardly or inwardly with respect to the casing.

The gear 23 meshes with a pinion 22 which is integral with a gear 21 and is suitably journalled in the casing sections. The gear 21 meshes with a pinion 20 fixed to the shaft of the electric motor 19. The housing of the electric motor has a flange fixed to the casing section 31.

For the purpose of sealing the casing 31, 57 rings 61 and 62 fixed to the heads 34 and 35 are connected with the casing sections by flexible diaphragm sleeves 48 and 49 permitting the casing to be filled with oil.

From the foregoing description it will be appreciated that when the vehicle carries no load or a small load and when the stops 34 and 35 assume their inner positions shown in Fig. 2, they are spaced from the arms 18 and 18′ whereby such arms are afforded a lost motion rendering the auxiliary springs 15 and 15′ inoperative to act on the wheel-suspending members 12 and 12′. However, when such wheel-suspending members swing upwardly with respect to the chassis 10 to compress the main springs 13, the arms 17 and 17′ will turn the torsional rods 15 and 15′ until a position is reached in which the arms 18 and 18′ will abut against the stops 34 and 35. Upon further compression of the springs 13 the stops 34 and 35 will brace the auxiliary springs 15 and 15′, whereupon the latter will be flexed so as to partly relieve the main springs 13.

Suitable means are provided to automatically stop the electric motor 19 when the spindles 28 and 30 reach either their innermost position shown in Fig. 2 or their outermost position. For such purpose, the ring 62 has an arm 36 to which a rod 37 is attached so as to extend parallel to the spindle 30. On the rod 37 two end stops 38 and 39 are attached in spaced relationship. Preferably, the end stops consist of a resilient material, such as rubber. On a horizontal outer stud 63 projecting forwardly from casing section 33 there is mounted a two armed vertical lever 40, the upper arm of which is straddled by the two stops 39 and 38, whereas the lower end thereof is linked to a manually operable rod 47 which may extend to the driver's seat so as to be readily operable by the driver. The lever 40 serves to control the reversible electric motor 19. For the sake of a simple illustration it has been assumed that the lever 40 is suitably electrically insulated from the casing section 33, the rod 37 and the rod 47 and is electrically connected to a wire 44 leading to a suitable source of current, such as a battery 64. The other terminal of the battery is connected by a lead 65 to one terminal 66 of the electric motor. Another terminal 67 thereof is connected by a wire 68 to a contact 45 mounted on an insulating bracket 41 attached to casing section 33. A third terminal 69 of the electric motor is connected by a wire 70 to a contact 46 provided on bracket 41. When the lever 40 is in its vertical position it engages a suitable detent 43 resiliently keeping the lever in such central neutral position.

When the lever 40 engages the contact 45 a circuit is closed extending from the source of current 64 through the wire 44, lever 42, contact 45, wire 68, terminal 67, the electric motor 19, terminal 66, and wire 65 to the battery 64, whereby the electric motor 19 will be caused to run in a direction driving the stops 34 and 35 outwardly. When the outermost position of the stops 34 and 35 will have been reached, the end stop 39 will engage the upper end of lever 40 and shift the same until it disengages contact 45 to thereby stop the electric motor 19. When the driver by suitable manipulation of rod 47 swings lever 40 into engagement with contact 46, a circuit will be closed extending from the battery 64 through wire 44, lever 40, contact 46, wire 70, terminal 69, electric motor 19, terminal 66 thereof, wire 65, back to the battery 64, whereby the electric motor 19 will be driven in the opposite sense displacing the stops 34 and 35 inwardly. Shortly before the position shown in Fig. 2 will be reached, the stop 38 will engage the upper end of lever 40 rocking the same out of engagement with contact 47 to thereby stop motor 19.

The operation of my novel spring-adjusting means is the following: When the elements are in a position shown in Fig. 2 in which the lever 40 assumes its inoperative neutral position in which the motor 19 is at rest and in which the adjustable spring stops 34 and 35 assume their inner positions, the arms 18 and 18' of the auxiliary springs 15 and 15' are free to oscillate, whereby the auxiliary springs are rendered inactive. If the driver desires to activate the auxiliary springs, for instance in order to maintain the road clearance irrespective of an increase of the load of the vehicle, he will pull rod 47 to the right with respect to Fig. 2 to thereby start the electric motor 19 in a direction causing it through the gearing 20, 21, 22, and 23 to drive the threaded sleeve 24 in a direction moving the spindles 28 and 30 and the stops 34 and 35 integral therewith in outward direction, whereby the arms 18 and 18' will be engaged and will be so rocked as to stress the auxiliary torsional springs 15 and 15'. As a result, the arms 17 and 17' will reduce the stress acting on the main springs 13. When the stops 34 and 35 reach their innermost or outermost end positions, the lever 40 will be engaged by the respective stop 38 or 39 and will be returned to neutral. It is to be understood, of course, that the rod 47 must not be held by any detent or the like so as not to interfere with the operation of the stops 38 and 39. When the driver wishes to disable the auxiliary springs 15 and 15', he will shift the rod 47 to the left to thereby engage lever 40 with contact 46. The motor will then withdraw the stops 34, 35 inwardly until lever 40 is returned to neutral either by the driver through rod 47 or by the stop 38.

While I have described my invention with reference to a preferred embodiment thereof, I wish it to be clearly understood that the same is in no way limited to the details described, but is capable of numerous modifications within the scope of the appended claims. Thus, means other than manually operable means may be provided for controlling motor 19. Also, the auxiliary springs 15 and 15' need not necessarily be formed by torsional rods, although such torsional rods are preferable.

What I claim is:

1. In a vehicle, a pair of co-axial horizontal transverse spring-adjusting spindles having threads of opposite hands, a threaded member mounted in threaded engagement with both of said spindles, a gearing adapted to produce relative rotation between said spindles and said member to thereby move said spindles towards or away from one another, a reversible electric motor in driving connection with said gearing, manually operable controlling means adapted to control said electric motor and settable to a neutral position and to opposite operative positions, and stops connected with at least one of said spindles for common displacement therewith and adapted to engage said controlling means and to move same to neutral position to thereby stop said motor when said spindles arrive at their innermost positions and when said spindles arrive at their outermost positions.

2. In a vehicle, a pair of co-axial horizontal transverse spring-adjusting spindles having threads of opposite hands, a common housing slidably and non-rotataby guiding said spindles, said spindles having threads of opposite hands, an internally threaded sleeve rotatably mounted in said housing in co-axial relationship to said spindles and in engagement with the threads thereof, a gear provided on said sleeve, a reversible electric motor attached to said housing, a gearing in said housing providing a driving connection between said motor and said gear, a controller lever mounted on said housing and adapted to assume a central neutral position and opposite end positions for starting said motor in opposite directions, manually operable means connected to said controller lever and adapted for manipulation to move said lever to either one of said end positions, and a pair of stops carried by one of said spindles and located on either side of said lever for engagement therewith, when said spindles arrive at an innermost position and when said spindles arrive at an outermost position, to thereby move said controller lever from one or the other of said end positions to said neutral position.

3. In a vehicle, the combination comprising a chassis, a rear axle transmission casing mounted thereon, a pair of half-axles below said chassis each linked to said casing for oscillation about a longitudinal axis, wheels journalled on said half-axles, helical springs interposed between and attached to said chassis and said axles, auxiliary springs each including a torsional rod rotatably mounted on said chassis and extending parallel to said axis between the same and the coordinated one of said wheels, front and rear arms fixed to either end of said rod, said rear arms extending outwardly towards said wheels to a point beneath said half-axles, a link connecting said rear arm of each one of said auxiliary springs to one of said half-axles, said front arms of said torsional rods extending upwardly, a pair of adjustable stops mounted on said chassis in the path of said last mentioned arms for engagement by the latter but normally spaced therefrom, said pair of stops being carried by a pair of horizontal co-axial threaded spindles having threads of opposite hands and extending transversely of the chassis and mounted thereon for axial displacement, a rotatable threaded member engaging said threads, a reversible electric motor geared to said threaded member, and manually operable means for operating said electric motor arbitrarily in one direction or the other.

4. In a vehicle, a pair of coaxial horizontal transverse spring adjusting spindles, means for moving said spindles towards or away from one another, a reversible drive means in driving connection with the said first-mentioned means, manually operable controlling means for controlling said driving means and settable to a neutral position and to opposite operative positions, and stops connected with at least one of said spindles for common displacement therewith to engage said controlling means and to move said controlling means to said neutral position to thereby stop said driving means upon arrival of said spindles at their innermost positions and at their outermost positions.

(References on following page)

References Cited in the file of this patent

UNITED STATES PATENTS

| | | |
|---|---|---|
| 2,161,431 | Rabe | June 6, 1939 |
| 2,191,211 | Krotz | Feb. 20, 1940 |
| 2,210,485 | Hawkins | Aug. 6, 1940 |
| 2,224,717 | Austin | Dec. 10, 1940 |
| 2,607,610 | Allison | Aug. 19, 1952 |

FOREIGN PATENTS

| | | |
|---|---|---|
| 758,790 | France | Nov. 7, 1933 |